(12) United States Patent
Fagergren

(10) Patent No.: US 12,319,257 B2
(45) Date of Patent: Jun. 3, 2025

(54) METHOD FOR MONITORING A TEMPERATURE OF A BRAKE SYSTEM OF A VEHICLE

(71) Applicant: Volvo Truck Corporation, Gothenburg (SE)

(72) Inventor: Mats Fagergren, Kungälv (SE)

(73) Assignee: Volvo Truck Corporation, Gothenburg (SE)

( * ) Notice: Subject to any disclaimer, the term of this patent is extended or adjusted under 35 U.S.C. 154(b) by 399 days.

(21) Appl. No.: 17/839,949

(22) Filed: Jun. 14, 2022

(65) Prior Publication Data
US 2022/0410865 A1 Dec. 29, 2022

(30) Foreign Application Priority Data
Jun. 29, 2021 (EP) .................................... 21182512

(51) Int. Cl.
*B60T 17/22* (2006.01)
*F16D 66/00* (2006.01)

(52) U.S. Cl.
CPC .............. *B60T 17/22* (2013.01); *F16D 66/00* (2013.01); *F16D 2066/001* (2013.01)

(58) Field of Classification Search
CPC ...... B60T 17/22; B60T 17/221; B60T 17/228; F16D 66/00; F16D 2066/001
USPC .......................... 188/1.11 E, 1.11 R; 303/191
See application file for complete search history.

(56) References Cited

U.S. PATENT DOCUMENTS

| | | | | |
|---|---|---|---|---|
| 4,790,606 A | * | 12/1988 | Reinecke | B60T 17/22 73/862.12 |
| 6,934,618 B2 | * | 8/2005 | Eckert | B60T 8/885 701/19 |
| 7,167,784 B2 | * | 1/2007 | Koerner | B60T 8/368 701/33.9 |
| 10,767,717 B2 | * | 9/2020 | Cremona | B60T 8/1708 |

(Continued)

FOREIGN PATENT DOCUMENTS

| | | |
|---|---|---|
| CN | 1147408 C | 4/2004 |
| CN | 108350961 A | 7/2018 |

(Continued)

OTHER PUBLICATIONS

Extended European Search Report for European Patent Application No. 21182512.0, mailed Dec. 21, 2021, 5 pages.

*Primary Examiner* — Thomas J Williams
(74) *Attorney, Agent, or Firm* — Withrow & Terranova, PLLC

(57) ABSTRACT

The disclosure relates to a method for monitoring a temperature of a brake system of a vehicle, the method comprising determining a dynamic warning temperature profile for the brake system, wherein the dynamic warning temperature profile is based on a warning temperature value of the brake system and a threshold value indicative of the number of times the temperature of the brake system exceeds the warning temperature value; monitoring the number of times when the temperature of the brake system exceeds the warning temperature value of the dynamic warning temperature profile; and when the number of times the temperature of the brake system exceeds the threshold value, adjusting the warning temperature level of the dynamic warning temperature profile to a reduced warning temperature level.

14 Claims, 4 Drawing Sheets

(56) References Cited

U.S. PATENT DOCUMENTS

| | | | | |
|---|---|---|---|---|
| 2004/0195050 | A1* | 10/2004 | Frentz | F16D 66/02 |
| | | | | 188/1.11 R |
| 2013/0187353 | A1 | 7/2013 | Mock et al. | |
| 2013/0342362 | A1* | 12/2013 | Martin | B61L 15/0018 |
| | | | | 374/152 |
| 2017/0072932 | A1* | 3/2017 | Steward | B60T 17/22 |
| 2017/0082164 | A1 | 3/2017 | Serra et al. | |
| 2019/0263510 | A1* | 8/2019 | Bill | F16D 66/021 |
| 2020/0339083 | A1* | 10/2020 | Bill | B60T 17/22 |
| 2022/0410865 | A1* | 12/2022 | Fagergren | B60T 17/22 |

FOREIGN PATENT DOCUMENTS

| | | | | |
|---|---|---|---|---|
| DE | 10105638 B4 * | 4/2011 | | B60K 28/10 |
| GB | 2397631 A * | 7/2004 | | B60T 17/22 |
| WO | 2019188407 A1 | 10/2019 | | |

* cited by examiner

METHOD FOR MONITORING A TEMPERATURE OF A BRAKE SYSTEM OF A VEHICLE

RELATED APPLICATIONS

The present application claims priority to European Patent Application No. 21182512.0, filed on Jun. 29, 2021, and entitled "METHOD FOR MONITORING A TEMPERATURE OF A BRAKE SYSTEM OF A VEHICLE," which is incorporated herein by reference in its entirety.

FIELD OF THE DISCLOSURE

The present disclosure relates to a method for monitoring a temperature of a brake system of a vehicle. The present disclosure also relates to a brake control system for monitoring a temperature of a brake system of a vehicle. Moreover, the disclosure relates to a vehicle comprising such a brake control system.

The disclosure can be applied in any type of hybrid vehicles or electric vehicles, such as partly or fully electric vehicles. Although the disclosure will be described with respect to an electric truck, the disclosure is not restricted to this particular vehicle, but may also be used in other hybrid or electrical vehicles such as electric buses, and electric cars. The disclosure may also be applied in any other type of electric vehicle such as electric powered construction equipment, electric working machines e.g. wheel loaders, articulated haulers, dump trucks, excavators and backhoe loaders etc.

BACKGROUND

With the introduction of new energy storage systems in various types of vehicles, such as batteries and fuel cells in heavy-duty vehicles, there has been an increasing activity for developing new and adequate solutions for a reliable operation of such systems, but also for other vehicle systems interacting with such systems. One area of particular interest in heavy-duty electric vehicles is the brake system and control of the brake system in an electrical vehicle.

In contrast to vehicles operating based on a diesel internal combustion engine, ICE, electric vehicles operating on batteries and/or fuel cells may generally not make use of parts of the brake system to the same extent as ICE vehicles, which is at least partly due to that the majority of the retardation power/energy is taken care of by the electric driveline of the vehicle. There may thus be a desire for another type of brake control strategy particularly adopted for electric vehicle.

Further, in connection with vehicles in the form trucks, also known as low-, medium and heavy-duty vehicles, there is often a high demand on the wheel brakes. These demands relate in particular to the braking capability of the wheel brake as they need to function properly in order to reduce vehicle speed properly. In order to safeguard for a possible accident due to a malfunction of the brake system, the vehicles may generally include one or more warning systems communicating with the brake systems so as to indicate if there is a malfunction relating to the brake system. One example of a possible malfunction of the brake system is an overheated brake system, such as an overheated brake disc, brake drum and the like. Typically, a wheel brake may comprise a brake disc connected to a wheel hub, which in turn is connected to a wheel of the vehicle. The wheel brake further comprises brake pads which are arranged to provide a brake action against the brake disc, i.e. a clamp against the brake disc, such that a rotational speed of the wheel is reduced. The brake disc will thus slip against the brake pads until the wheel has stopped its motion. This creates frictional heat in the brake disc which needs to be taken care of.

While there are a number of different types of temperature warning systems for brake systems of vehicles, there still remains a need for an improved control of a vehicle brake system, in particular for vehicles such as electric vehicle. In addition, it would be desirable to further improve the overall performance of the vehicle brake system during operation of the vehicle.

SUMMARY

An object of the disclosure is to provide an improved method for monitoring a temperature of a brake system of a vehicle, in which alerts to a user of the vehicle can be communicated in a more reliable manner. The object is at least partly achieved by a method according to claim 1.

According to a first aspect of the disclosure, there is provided a method for monitoring a temperature of a brake system of a vehicle. The method comprises: determining a dynamic warning temperature profile for the brake system, wherein the dynamic warning temperature profile is based on a warning temperature value of the brake system and a threshold value indicative of the number of times the temperature of the brake system exceeds the warning temperature value; monitoring the number of times when the temperature of the brake system exceeds the warning temperature value of the dynamic warning temperature profile; and when the number of times the temperature of the brake system exceeds the threshold value, adjusting the warning temperature level of the dynamic warning temperature profile to a reduced warning temperature level.

In this manner, the proposed method allows for operating a vehicle in a more reliable and efficient manner during a braking operation of the vehicle. By the provision of a method which takes advantage of determining a dynamic warning control temperature profile it becomes possible to adjust the warning or alert temperature control strategy for the vehicle to reduce the risk of having unnecessary or too frequent warnings and alerts for overheated brakes to the user of the vehicle.

The method is thus at least partly based on the observation that hitherto known brake control systems for vehicles often are based on pre-defined and fixed brake temperature limits as part of their safety and monitoring systems. These limits can contain one or sometimes two pre-defined "temperature zones" which informs the driver to act in a certain way to achieve a wanted situation in the vehicle. These temperature limits can be for example "a warning limit" and "a stop-the-vehicle limit". Normally, if the brake system on the vehicle is well balanced and designed, the temperature in the wheel brakes, under normal use, are below the pre-defined temperature limits of the vehicle or brake ECU and therefore no warning or stop demand is send to the driver. If the limit is exceeded, the driver will notice it through a visible warning light signal or similar device and subsequently decide on the relevant measures as defined in the owners/driver's manual. On the other hand, if the limits are set at a too low level, causing frequent activation, or that the brake system is not well dimensioned, causing the same phenomena, the driver may disregard e.g. the warning light signal, particularly if the driver at earlier occasions noticed that the vehicle behaved well even if the warning light signal or stop signal was activated. This "frequent" warning may lead to situations where the driver ignores the warning signals, thus causing the brakes to be worn out or even increase the stopping distance. Too low pre-defined warning temperature limits can also cause the vehicle manufactures to design over-dimensioned and expensive auxiliary brake systems that may necessarily not be needed.

Hence, in contrast to hitherto known brake control systems using fixed brake temperature warning/stop limits, the proposed method provides for using a dynamic warning control temperature profile that is based on an initially warning temperature value of the brake system and a threshold value indicative of the number of times the temperature of the brake system exceeds the warning temperature value. In other words, the dynamic warning control temperature profile takes into account the number of times the temperature of the brake system exceeds a defined warning temperature value, and subsequently adjust the warning temperature level of the braking system to a reduced level if/when the threshold value is exceeded. Hereby, the proposed method may allow for a higher initial warning/stop limit than a brake control system using fixed brake temperature warnings. In addition, it also becomes possible to reduce unnecessary warnings to users of the vehicle that rarely reach the conditions of the dynamic warning control temperature profile, and thus reduce the risk of distracting the users or reduce the risk that users disregard the communicated warnings, which in itself can have a negative impact on the vehicle performance.

By way of example, too frequent warnings may cause a driver to unnecessarily slow down or stop the vehicle which reduces uptime or even worse, disregard the warning signal and continue to brake the vehicle with risk of real overheating.

In other words, the proposed method also provides an improved temperature warning management of the brake system so as to secure a desired vehicle performance.

Accordingly, in at least one example embodiment, the method is intended for controlling temperature alerts communicated to a user of the vehicle. That is, the method controls the temperature alerts communicated to a user of the vehicle on the basis of the dynamic warning temperature profile, such that alerts to the user are only communicated when the threshold value is exceeded.

The proposed method is particularly suitable for electric vehicles including an energy storage system in the form of a battery system or a fuel cell system. In these types of vehicles, the wheel brake system is less used since the majority of the retardation power/energy may generally be taken care of by the electric driveline. However, when the batteries are close to or fully charged, the auxiliary brake power/energy may be limited, which then requires that the wheel brakes are used to a higher extent compared to internal combustion engine vehicles which generally also employ engine brake systems or similar. As such, depending on e.g. vehicle weight, route topography, speed and the battery status, the number of times that the temperature limit in the wheel brakes is exceeded, can be relatively high. By providing a method according to the proposed examples, it becomes possible to handle such occasion in a more optimal manner.

Optionally, although strictly not required, the method comprises the initial step of determining an initial warning temperature level of the brake system associated with communicating an alert to a user.

According to an example embodiment, the method further comprises monitoring the number of times when the temperature of the brake system exceeds the reduced warning temperature value of the brake system.

According to an example embodiment, the method further comprises adjusting the dynamic warning temperature profile by reducing the threshold value indicative of the number of times the temperature of the brake system exceeds the reduced temperature value to a reduced threshold value. Reducing the number-of-times threshold value according to this configuration allows for further improving the temperature warning management of the brake system in that the conditions of the dynamic temperature profile is adjusted in a simple, yet precise manner.

In addition, or alternatively, the method may comprise adjusting the dynamic warning temperature profile by reducing the threshold value indicative of the number of times the temperature of the brake system exceeds the initial warning temperature value to a reduced threshold value.

Typically, although strictly not required, the method may further comprise iterating the step of adjusting the warning temperature level of the dynamic warning temperature profile to a reduced warning temperature level by further reducing the reduced warning temperature value of the brake system to a reduced warning temperature value of the brake system until the number of iterations exceeds an iteration threshold value. Subsequently the method comprises maintaining the latest reduced warning temperature level as a stationary warning temperature of the brake system.

In addition, or alternatively, the method may comprise iterating the step of adjusting the dynamic warning temperature profile by further reducing the threshold value indicative of the number of times the temperature of the brake system exceeds the warning temperature value to a reduced threshold value until the number of iterations exceeds an iteration threshold value. Subsequently, the method comprises maintaining the latest reduced threshold value as a stationary threshold value.

According to an example embodiment, the method further comprises communicating an alert to a user when the number of times the temperature of the brake system exceeds the threshold value. Analogously, the method may further comprise communicating an alert to a user when the number of times the temperature of the brake system exceeds the reduced threshold value.

By way of example, the dynamic warning temperature profile comprises a number of consecutive warning temperature values of the brake system and the threshold value defines a number of sub-threshold values. Further, each one of the sub-threshold values is indicative of a number of times the temperature of the brake system exceeds a given warning temperature value among the number of consecutive warning temperature values. Moreover, the method may comprise monitoring the number of times when the temperature of the brake system exceeds any one of the numbers of consecutive warning temperature values.

It should be noted that the method can be implemented to monitor and control a number of different types of vehicle brake system, such as any one of a brake disc, a brake drum and a retarder of a vehicle brake system. Accordingly, the step of monitoring the number of times when the temperature of the brake system exceeds the warning temperature value may comprise monitoring the temperature of any one of a brake disc, a brake drum and a retarder of the brake system.

The temperature of the brake system can be monitored in several different ways. The process of monitoring the temperature of the brake system may generally at least partly depend on the type of brake system, vehicle type and type of brake control system. The temperature of the brake system may typically be a reading of a present temperature level of the brake system, e.g. by a temperature sensor. Alternatively, or in addition, the temperature of the brake system may typically be a reading of an infrared sensor, such as an infrared temperature sensor or any other type of sensor suitable for monitoring changes in temperature and/or heat. Alternatively, or in addition, the temperature of the brake system may be performed by an infrared camera arranged adjacent the brake system. By way of example, the temperature of the brake system is monitored by a sensor arranged adjacent a heat generating component of the brake system. In addition, or alternatively, the temperature of the brake system may be monitored by a sensor arranged in the brake system. In addition, or alternatively, the temperature of the brake system may be determined directly by the control unit and/or via a data model of the brake system, as conventionally known in the field of monitoring and determining a current temperature of the brake system. In addition, or alternatively, the temperature of the brake system may be monitored by a brake control system of the brake system and based on a temperature model of the brake system. The temperature model may generally be based on predetermined operational data and characteristics of the brake system, including data such as brake pressure, type of brake etc. Further, such temperature model may contain historical data of the operations of the brake system affecting the temperature levels. The temperature model of the brake system may be stored in a memory of the control unit of the brake control system.

Typically, the number of times when the temperature of the brake system exceeds the warning temperature value is monitored over a continuous braking operation of the vehicle. The extent of the continuous braking operation of the vehicle may vary for various operations and activities of the brake system and the vehicle, and may also vary depending on type of installation, application and route profile.

It is to be noted that the method may generally be performed by a control unit during use of the vehicle. Accordingly, any one of the steps of the method may be performed by the control unit during use of the vehicle.

Any one of the determined warning temperature level, the determined dynamic warning temperature profile, the threshold values (s) the reduced threshold values(s) and the reduced warning temperature level(s) may typically be values communicated to and/or stored in the control unit of the brake control system. In addition, or alternatively, the determined warning temperature level, the determined dynamic warning temperature profile, the threshold value(s) and the reduced warning temperature level may be updated based on the ordinary use of the brake system.

In the context of the example embodiments, the term "critical warning temperature level" typically refers to an uppermost safety operational temperature level of the brake system indicative of a need to stop the vehicle so as to avoid permanent damage of the brake. This warning temperature level may e.g. relate to and/or be determined based on a characteristic of the brake system. This warning temperature level is also the uppermost temperature level of all set warning temperature levels. The critical warning temperature level is generally derivable from the manufacturer of the brake system and subsequently stored in the control unit. Such critical warning temperature level is also generally set with a high safety margin by the manufacturer. Further, such critical safety temperature level may generally be a predefined static brake system temperature level.

In the context of the example embodiments, the term "warning temperature value of the brake system", as used herein, typically refers to a temperature level of the brake system that is initially set by the control unit, user of the vehicle and/or manufacture of the vehicle, and is defined in respect to an estimated maximum allowable temperature level of the brake system for ensuring an ordinary and durable use of the brake system. Thus, this warning temperature value of the brake system is typically set to a relatively lower value than the critical warning temperature level of the brake system.

The warning temperature value of the brake system may be adjusted and varies depending on the ordinary use of the brake system and the vehicle. As described herein, the warning temperature value of the brake system may generally be reduced by the method and control unit to a reduced warning temperature value of the brake system in view of the dynamic warning temperature profile and the monitored number of times when the temperature of the brake system exceeds the warning temperature value. To this end, the warning temperature value as used in the context of the dynamic warning temperature profile is generally a temporarily warning temperature level that is adjusted based on the number of times the temperature of the brake system exceed the temperature level.

The warning temperature level, as used herein, may generally be initially determined based on the type brake system and the type of vehicle.

According to one example embodiment, the steps of the method are performed in a sequence. However, at least some of the steps of the method can be performed concurrently. The method according to the example embodiments can be executed in several different manners. As mentioned above, the example embodiments of the method and the sequences of the methods, typically corresponding to the steps of the method, are executed by the control unit. In one example embodiment, any one of the steps of the method is performed by a brake control system during use of the vehicle. The brake control system comprises the brake system and the control unit. Thus, according to one example embodiment, the steps of the method are performed by the control unit during use of the vehicle. The method may be continuously running as long as the vehicle is operative. The sequences of the method may likewise be performed by other types of components and by other technologies as long as the method can provide the associated functions and effects.

According to a second aspect of the disclosure, there is provided a computer program comprising program code means for performing the steps of the first aspect when the program is run on a computer.

According to a third aspect of the disclosure, there is provided a computer readable medium carrying a computer program comprising program code means for performing the steps of the first aspect when the program product is run on a computer.

Effects and features of the second and third aspects are largely analogous to those described above in relation to the first aspect.

According to a fourth aspect of the disclosure, there is provided a brake control system for a vehicle. The brake control system comprises a brake system and a control unit for monitoring a temperature of the brake system. The brake control system and/or the control unit is configured to determine a dynamic warning temperature profile. The dynamic warning temperature profile is based on a warning temperature value of the brake system and a threshold value indicative of the number of times the temperature of the brake system exceeds the warning temperature value. The control unit is further configured to monitor the number of times when the temperature of the brake system exceeds the warning temperature value; and, when the number of times the temperature of the brake system exceeds the threshold value, adjust the warning temperature level of the dynamic warning temperature profile to a reduced warning temperature level.

Optionally, the control unit may be configured to determine an initial warning temperature level of the brake system associated with communicating an alert to a user.

Effects and features of the fourth aspect of the disclosure are largely analogous to those described above in connection with the first aspect.

According to a fifth aspect of the disclosure, there is provided a vehicle comprising a brake system and a brake control system according to the fourth aspect. Effects and features of the fifth aspect of the disclosure are largely analogous to those described above in connection with the first aspect.

The vehicle may be an electric vehicle, such as a fully or hybrid electrical vehicle, comprising an energy storage system and an electric propulsion system. The vehicle may be an electrical, hybrid, or plug-in hybrid vehicle comprising an electrical motor, wherein the energy storage system provides power to the electrical motor for providing propulsion for the electrical, hybrid, or plug-in hybrid vehicle.

Further features of, and advantages with, the present disclosure will become apparent when studying the appended claims and the following description. The skilled person realizes that different features of the present disclosure may be combined to create embodiments other than those described in the following, without departing from the scope of the present disclosure.

BRIEF DESCRIPTION OF THE DRAWINGS

The above, as well as additional objects, features and advantages of the present disclosure, will be better understood through the following illustrative and non-limiting detailed description of exemplary embodiments of the present disclosure, wherein.

Figure 1:
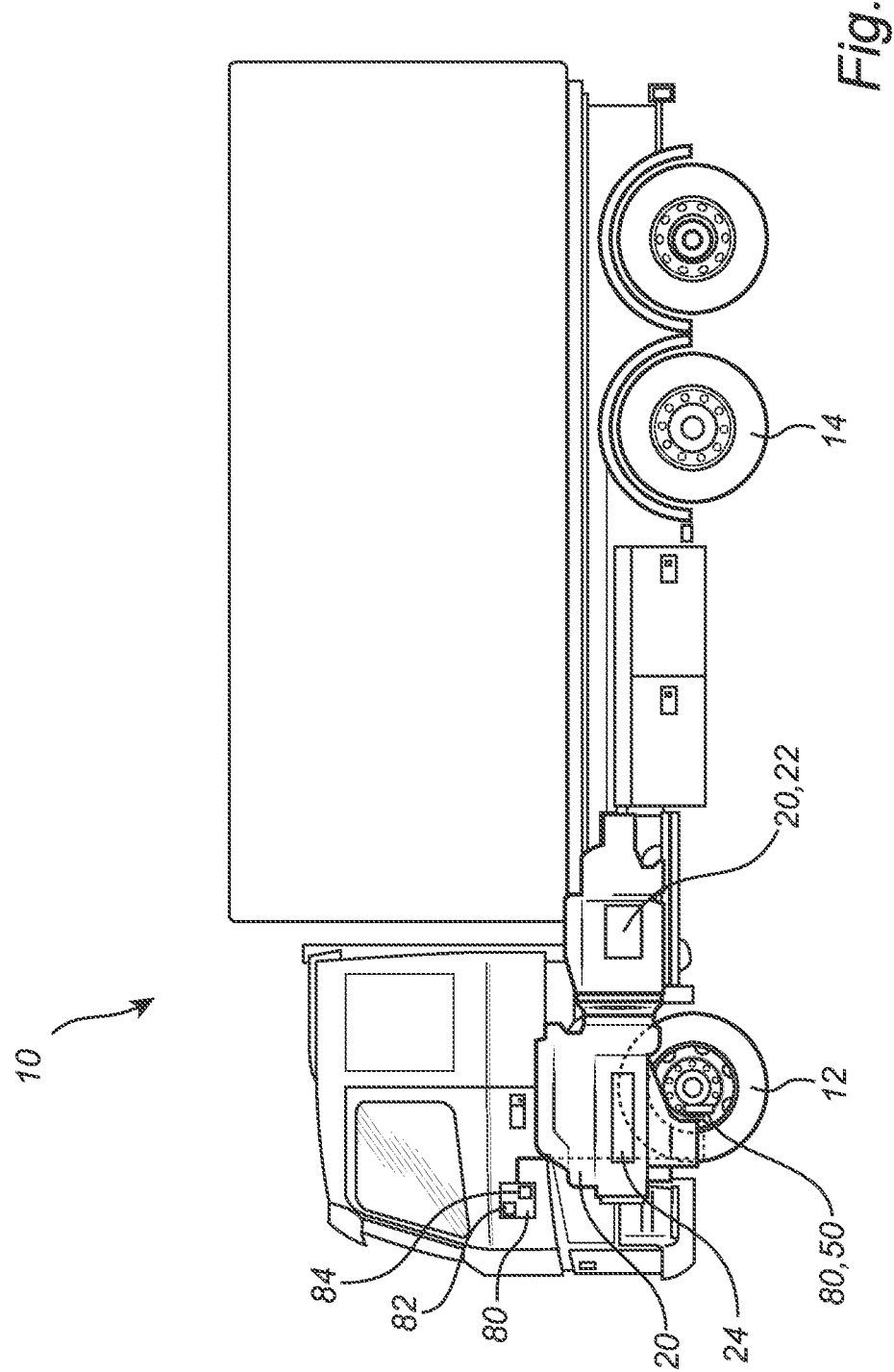
FIG. 1 is a vehicle in the form a truck according to example embodiments of the disclosure.

With reference to the appended drawings, below follows a more detailed description of embodiments of the disclosure cited as examples.

DETAILED DESCRIPTION OF EXAMPLE EMBODIMENTS OF THE DISCLOSURE

The present disclosure will be described more fully hereinafter with reference to the accompanying drawings, in which exemplary embodiments of the disclosure are shown. The disclosure may, however, be embodied in many different forms and should not be construed as limited to the embodiments set forth herein; rather, these embodiments are provided for thoroughness and completeness. The skilled person will recognize that many changes and modifications may be made within the scope of the appended claims. Similar reference characters refer to similar elements throughout the description.

Referring now to the drawings and to FIG. 1 in particular, there is depicted an exemplary vehicle, here illustrated as an electrical truck 10. In this example, the electric truck is a fully electrical vehicle. The electrical truck 10 comprises an electric propulsion system 20 configured to provide traction power to the vehicle. The electric propulsion system here comprises an electrical energy storage system 22 and an electrical machine 24. The energy storage system 22 here comprises a battery system including one or more batteries. The electrical energy storage system 22 is connected to the electrical machine 24 to provide power to the electrical machine, thereby the electrical machine can provide traction power to one or more ground engaging members, e.g. one or more wheels 12 and 14. The electric machine may generally include a conventional electric motor.

The electrical propulsions system 20 also comprises additional components as is readily known in the field of electrical propulsions systems, such as a transmission (not shown) for transmitting a rotational movement from the electric motor(s) to a propulsion shaft, sometimes denoted as the drive shaft (not shown). The propulsion shaft connects the transmission to the wheels. Furthermore, although not shown, the electrical motor is typically coupled to the transmission by a clutch.

Turning again to FIG. 1, the vehicle 10 comprises a pair of front wheels 12 and a pair of rear wheels 14. The vehicle may also comprise additional pairs of wheels, as indicated in FIG. 1. Moreover, as depicted, the front pair of wheels 12 comprises a wheel brake system 50 arranged for controllably reducing the vehicle speed of the vehicle 10. The wheel brake system 50 is operated by controlling a brake pedal arranged in the vehicle compartment, or by means of a suitable brake control system. The brake pedal may be an integral part of the brake control system. Although not depicted, also the rear wheels 14 may comprise a similar wheel brake system 50 as the front wheels 12. The wheel brake arrangement may generally be provided in the form of a conventional type of wheel brake arrangement, including e.g. a brake pad comprising a friction material, i.e. a pad material, for abutting against a brake disc during braking. The brake disc is arranged to slip against the brake pad(s) until the wheel has stopped its motion. This creates frictional heat in the brake disc which needs to be taken care of. In order to ensure a reliable operation of the brake system, there is generally a need to monitor the heat generated in the brake system, e.g. by monitoring or estimating the temperature of the brake disc during a braking operation, so as to avoid overheating and/or a malfunction of the brake system 50, or any components associated with the brake system such as the brake disc.

As such, as depicted in FIG. 1, the electrical truck 10 further comprises a brake control system 80. The brake control system 80 comprises the brake system 50 and a control unit 82 for monitoring a temperature of the brake system. The control unit 82 is configured to control and monitor the brake system 50. In this example, the control unit is an electronic control unit. By way of example, the electronic control unit is configured to operate the brake system 50 according to any one of the example embodiments of a method, as described in any one of the FIGS. 2 to 4. The brake control system 80 may also comprise an acquiring data unit 84. The acquiring data unit 84 is configured to gather data relating to the temperature of the brake system. The acquiring data unit 84 is also configured to transmit the gathered data to the control unit of the brake control system 80 for further processing. The communication between the acquiring data unit 84 and the control unit 82 can be made by a wire connection, wirelessly or by any other technology such as Bluetooth or the like. Analogously, the communication between the acquiring data unit 84, the control unit 82 and any temperature sensor at or adjacent the brake system 50 may be made by a wire connection, wirelessly or by any other technology such as Bluetooth or the like.

In this example, the brake control system 80 further comprises a user communication device (not illustrated) in networked communication with the control unit 82 of the brake control system. By way of example, the user communication device may be arranged in a dashboard of the vehicle. The user communication device may also be a touch screen or a portable device such as cellular phone.

The user communication device is configured to communicate brake system temperature alert(s) to the user. The alert(s) may be in the form of a visual warning that the temperature threshold value is exceeded. In addition, or alternatively, the alert may contain a digit indicative of the temperature.

By way of example, the brake control system 80 determines that the threshold value is exceeded, as described herein according to any one of the example embodiments, and then communicates an alert to the user via the user communication device. The user communication device is here also configured to receive a control signal indicative of the number of times the temperature of the brake system is exceeded and that the threshold value is exceeded. The user communication device subsequently communicates such data to the user in the form of an appropriate alert signal. The alert signal may be a visual alert or a simple sound alert. Accordingly, the brake control system 80 may likewise be configured to transmit a signal to the user communication device being indicative of the number of times the temperature of the brake system is exceeded and that the threshold value is exceed. Then, in response to a user (such as a driver), using the user communication device, a user control signal may be transmitted to the brake control system. The user control signal typically comprises data indicative of user instructions or the like, such as a need for a precautionary action of the vehicle.

Figure 2:
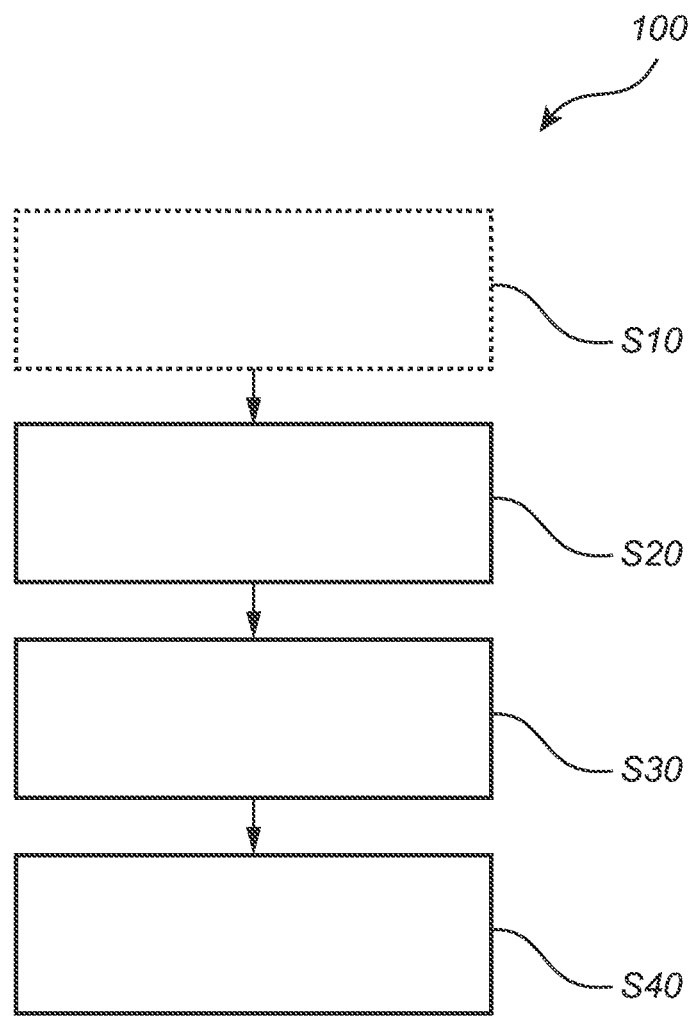
FIG. 2 is a flow-chart of method steps according to an example embodiment of the disclosure.
Figure 3:
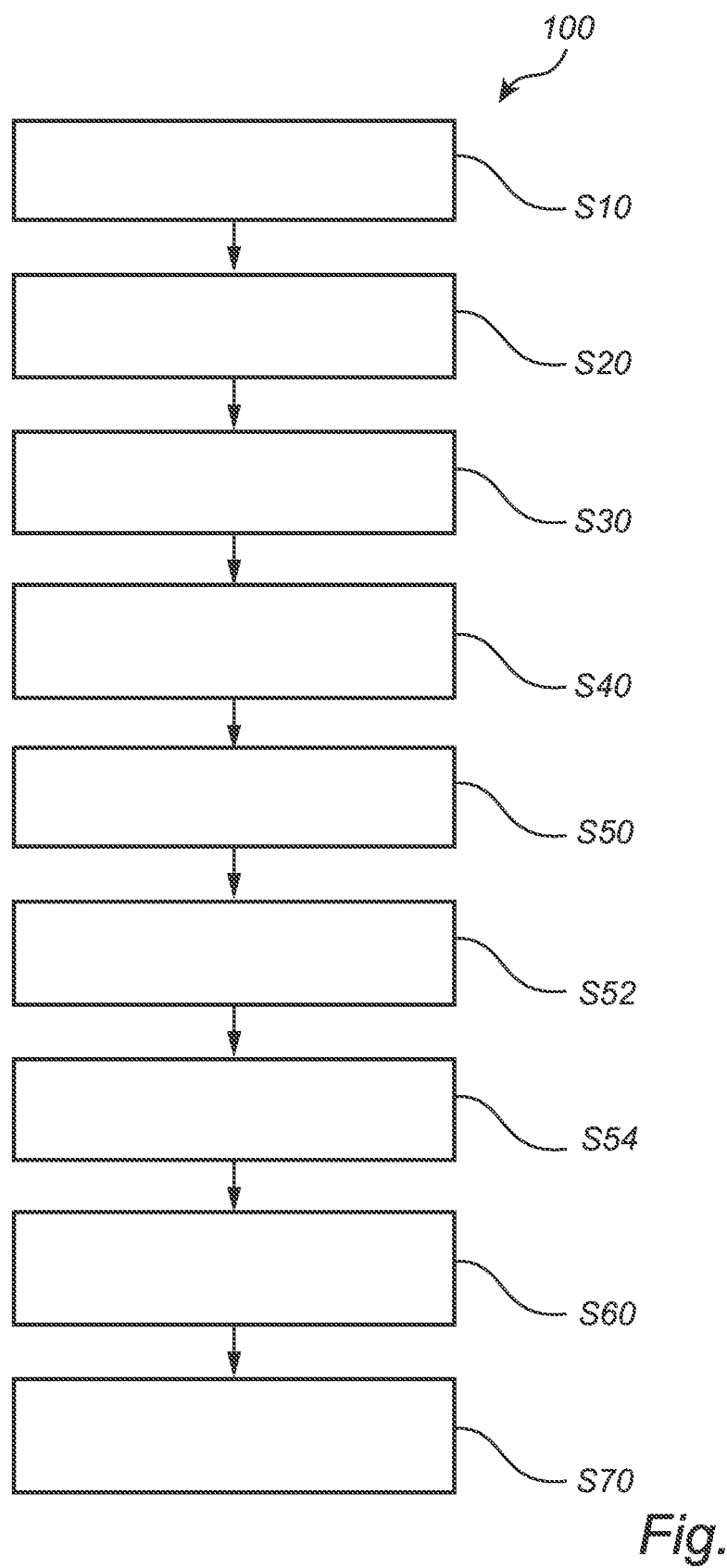
FIG. 3 is a flow-chart of method steps according to an example embodiment of the disclosure.
Figure 4:
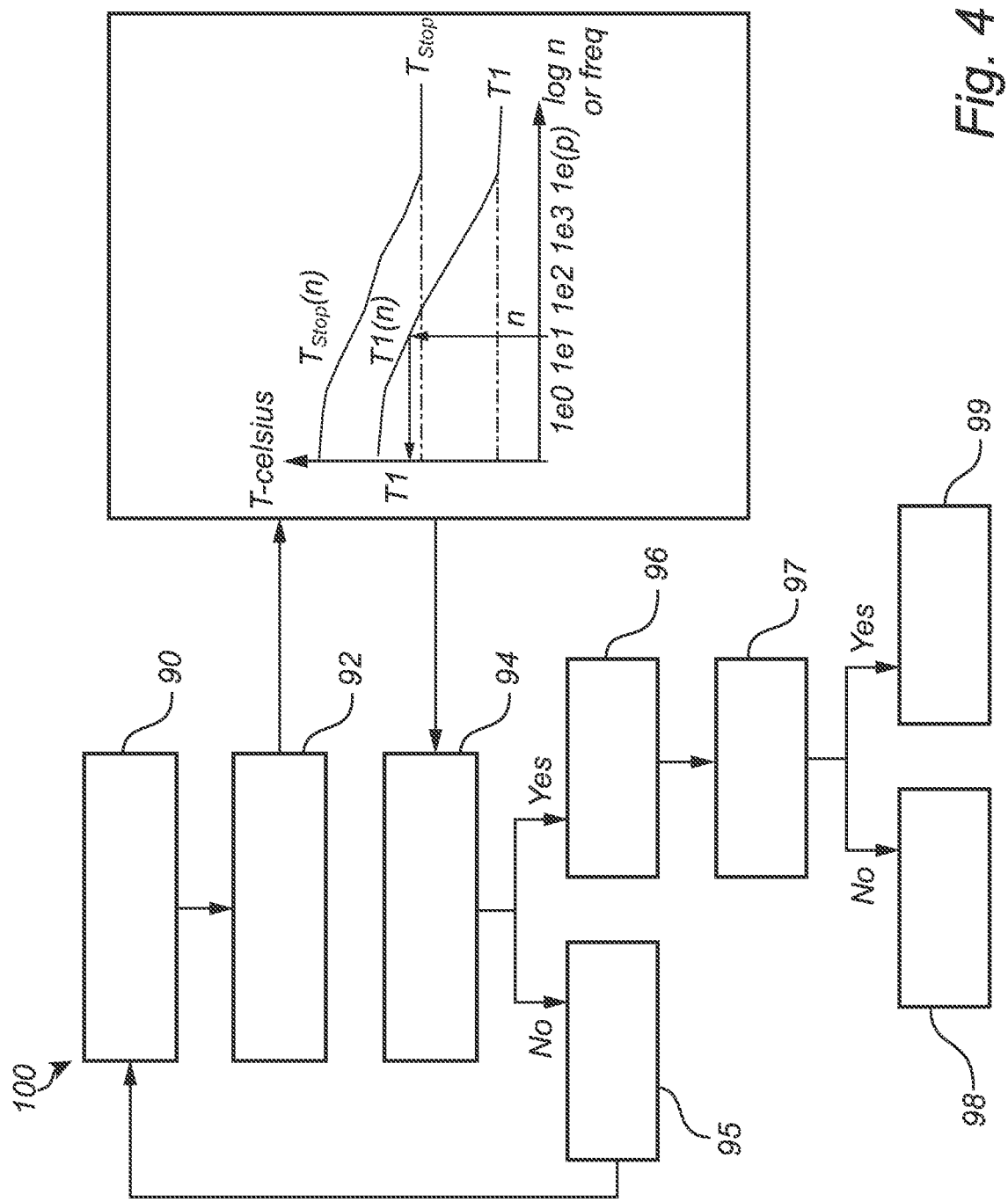
FIG. 4 is a flow-chart of method steps according to an example embodiment of the disclosure.

In order to describe the brake control system 80 of the wheel brake system 50 in further detail, reference is now made to FIGS. 2-4 which illustrates various example embodiments thereof. The brake control system 80 is operable by a method according to any one of the example embodiments as described in any one of the FIGS. 2 to 4.

Turning now to FIG. 2, there is depicted a flowchart of a method according to an example embodiment of the disclosure. The method 100 is intended for monitoring a temperature of the brake system 50 of the vehicle 10, as described in relation to FIG. 1. The sequences of the method are typically performed by the brake control system 80, including the control unit 82, as described herein.

Optionally, the method initially comprises a step of determining S10 a suitable initial warning temperature level T1 of the brake system 50 associated with communicating an alert to a user. Typically, although not strictly required, the step of determining S10 the warning temperature level of the brake system 50 associated with communicating an alert to a user is performed by the control unit 82 of the brake control system 80. The warning temperature level may be defined and stored in a memory of the control unit 82. Typically, the initial warning temperature level is a predetermined temperature level acquired from the manufacturer of the brake system or defined by the manufacturer of the vehicle.

In a following step, the method comprises the step of determining S20 a dynamic warning temperature profile based on the initially defined warning temperature value T1 of the brake system and a first threshold value indicative of a maximum allowable number of times the temperature of the brake system can exceed the initially defined first warning temperature value.

Subsequently, the method comprises the step of monitoring S30 the number of times when the temperature of the brake system exceeds the initially defined warning temperature value T1. By way of example, the control unit 82 of the brake control system 80 is configured to monitor the number of times when the temperature of the brake disc exceeds the initially defined warning temperature T1. Moreover, the control unit 82 is here in communication with a data acquiring unit 84 adapted to gather temperature data of the brake disc during braking of the vehicle, and thus during use of the brake system. The data acquiring unit 84 is configured to gather temperature data from the brake system 50 so as to permit the brake control system 80 to monitor the number of times when the temperature T of the brake system 50 exceeds the initially defined warning temperature level T1.

The data acquiring unit 84 may comprise or communicate with a temperature sensor (not shown) arranged adjacent the heat generating components of the brake system 50. By way of example, the temperature T of the brake system 50 is monitored by a sensor arranged at the brake system. In other examples, the temperature of the brake system 50 is monitored by the control unit 82 of the brake system 80. Hence, the temperature of the brake system 50 can be monitored in several different ways, and not always by means of a temperature sensor. For example, the temperature of the brake system may likewise be monitored based on a temperature model of the brake system containing historical data relating to temperature as a function of brake pressure etc. Such temperature model is generally stored in a memory of the control unit 82.

Moreover, the number of times when the temperature of the brake system 50 exceeds the warning temperature value is monitored over a continuous braking operation of the vehicle, i.e. when the brake disc is in active engaged state to reduce the rotation of the wheel.

Depending on the outcome of the above monitoring step, the brake control system 80 is configured to perform an adjustment of the current warning temperature level T1 of the brake system 50 in order to provide an improved and more flexible control strategy for communicating alerts to the user.

As such, the method comprises the step of adjusting S40 the warning temperature level of the brake system 50 to a reduced warning temperature level $T_{Red}$ when the number of times the temperature of the brake system exceeds the threshold value. In addition, the initial warning temperature level of the dynamic warning temperature profile is here replaced with the reduced warning temperature level. Thereafter, the method may generally be iterated, as further described herein.

In one possible implementation of the method, the current temperature of the brake system 50 is defined as T. In addition, an initial warning temperature level T1 of the brake system 50 is set to e.g. 450 degrees. Accordingly, the dynamic warning temperature profile is initially based on the initial warning temperature level T1 of the brake system 50 and a threshold value n indicative of the number of times the temperature of the brake system exceeds the initial warning temperature value T1. In addition, the threshold value n is here set to 10 times. That is, the dynamic warning temperature profile is based on a condition that the brake system may not exceed the temperature of 450 degrees more than ten times. If the brake system exceeds the temperature of 450 degrees more than ten times, the brake control system 80 will communicate an alert to the user, as described herein.

FIG. 3 illustrates another example embodiment. The method according to the example embodiment in FIG. 3 generally comprises the steps as described in relation to the example embodiment in FIG. 2. Accordingly, the method here comprises the optional step of determining S10 an initial warning temperature level of the brake system associated with communicating an alert to a user. In addition, the method comprises determining S20 the dynamic warning temperature profile for the brake system, e.g. as described above in FIG. 2; monitoring S30 the number of times when the temperature of the brake system exceeds the warning temperature value; and when the number of times the temperature of the brake system exceeds the threshold value, adjusting S40 the warning temperature level of the dynamic warning temperature profile to a reduced warning temperature level. As should be readily appreciated, the temperature of reduced warning temperature value is lower than the initial warning temperature value.

Moreover, as illustrated in FIG. 3, the method 100 after step S40 here performs a number of additional steps S50 to S70. More specifically, the method further comprises monitoring S50 the number of times when the temperature of the brake system exceeds the reduced warning temperature value of the brake system.

In addition, the method here comprises adjusting the dynamic warning temperature profile by reducing S52 the threshold value indicative of the number of times the temperature of the brake system exceeds the reduced warning temperature value to a reduced threshold value $n_r$. As should be readily appreciated, the reduced threshold value $n_r$ is here a threshold value with a lower number than the number of the previous threshold value n.

In addition, or alternatively, the method here comprises adjusting the dynamic warning temperature profile by reducing S54 the threshold value indicative of the number of times the temperature of the brake system exceeds the initial warning temperature value to a reduced threshold value. As should be readily appreciated, the reduced threshold value $n_r$ is here a threshold value with a lower number than the number of the previous threshold value n.

While the method according to some implementations of the example embodiments may terminate the sequence of adjusting the dynamic warning temperature profile after one single reduction of the warning temperature value and/or the threshold value, a more common exemplary implementation of the method comprises additional steps, as also illustrated in FIG. 3. In particular, the method may generally iterate one or more steps during a vehicle operation of the truck. Hence, the method here further comprises the step of iterating S60 at least the step of adjusting the dynamic warning temperature profile by further reducing the warning temperature value of the brake system to a reduced warning temperature value of the brake system threshold value. Subsequently, the method comprises the step of maintaining the latest reduced warning temperature level as a stationary warning temperature of the brake system.

In addition, or alternatively, the method may further comprise the step of iterating at least the step of adjusting the dynamic warning temperature profile by reducing the threshold value indicative of the number of times the temperature of the brake system exceeds the warning temperature value to a reduced threshold value until the number of iterations exceeds an iteration threshold value. Subsequently, the method comprises the step of maintaining the latest reduced threshold value as a stationary threshold value.

Typically, the method as illustrated in FIG. 3, also comprises the step of communicating S70 the alert to the user when the number of times the temperature of the brake system has exceeded the threshold value. Optionally, the method may comprise the step of communicating an alert to the user when the number of times the temperature of the brake system has exceeded any one of the above threshold values, including the reduced threshold value. It should be noted that the step of communicating S70 an alert to the user when the number of times the temperature of the brake system has exceeded the threshold value may likewise be included in the method illustrated in FIG. 2 above.

As mentioned above, the temperature T of the brake system 50 can be gathered from measuring the temperature of the brake disc by the temperature sensor or by data received at the control unit from a brake system model stored in a memory of the brake control system. Such brake system model is based on the characteristics of the brake system including the brake disc. Data relating to the dynamic warning temperature profile, the warning temperature level and the threshold value etc. may generally be stored in the memory of the brake control system.

Moreover, in an exemplary extended implementation of the method according the above example as illustrated in FIGS. 2 and/or 3, the dynamic warning temperature profile comprises a number of consecutive warning temperature values of the brake system and the threshold value defines a number of sub-threshold values. Further, each one of the sub-threshold values is indicative of a number of times the temperature of the brake system exceeds a given warning temperature value among the number of consecutive warning temperature values. For this reason, the method here also comprises monitoring the number of times when the temperature of the brake system exceeds any one of the numbers of consecutive warning temperature values. Accordingly, during operation of the vehicle, the method may be operating in accordance to the following exemplifying sequence.

Initially, the brake control system 80 measures and/or calculates the brake temperature T of the brake system 50. Hence, the current temperature of the brake system 50 is defined as T. In addition, the dynamic warning temperature profile here comprises a number of consecutive warning temperature values T1 and T2 of the brake system and a number of threshold values associated with the number of consecutive warning temperature values T1 and T2.

In other words, the brake control system 80 is here configured to determine a first warning temperature level T1 of the brake system 50, which here is set to e.g. 450 degrees. In addition, the threshold value $n_1$ for the first warning temperature level T1 is here set to 10 times. That is, the dynamic warning temperature profile is based on a condition that the brake system may not exceed the temperature of 450 degrees more than ten times.

Then, if the brake system 50 exceeds the temperature of 450 degrees more than ten times, the brake control system 80 will communicate an alert to the user, as described herein. In addition, in this example embodiment, the brake control system 80 is configured to determine a second warning temperature level T2 of the brake system 50, which here is set to e.g. 400 degrees. In addition, the threshold value $n_2$ for the second warning temperature level T2 is here set to 1000 times. That is, the dynamic warning temperature profile is also based on a second condition that the brake system 50 may not exceed the temperature of 400 degrees more than 1000 times. If the brake system 50 exceeds the temperature of 400 degrees more than 1000 times, the brake control system 80 will also communicate an alert to the user, as described herein.

Another example embodiment of the method is depicted in FIG. 4. The method illustrated in FIG. 4 is based on the sequence of the method according to example embodiment in FIG. 2. In addition, in FIG. 4, there is an additional temperature warning level corresponding to a critical warning temperature $T_{stop}$. The critical warning temperature $T_{stop}$ is here an uppermost temperate level indicative of a need to stop the vehicle so as to avoid permanent damage of the brake system.

Initially, the brake control system 80 measures and/or calculates the brake temperature T of the brake system 50, as indicated by reference 90, and also described above. Hence, the current temperature of the brake system 50 is defined as T.

As indicated by reference 92, the dynamic warning temperature profile here comprises the first warning temperature value T1, but also a second warning temperature value in the form of the uppermost critical warning temperature $T_{stop}$.

As mentioned above in relation to e.g. FIG. 2, the brake control system 80 monitors S30 the number of times when the temperature of the brake system exceeds the first warning temperature value T1. In addition, the brake control system 80 monitors if the temperature T exceeds the uppermost critical warning temperature $T_{stop}$.

Further, as long as the temperature T does not exceed the first warning temperature value T1 a number of times exceeding the set threshold value n, e.g. ten times, the brake system 50 continues according to the current control temperature brake strategy and without communicating any alerts to the user. This operation is indicated with reference 95 in FIG. 4. However, if the brake system exceeds the first warning temperature value T1 more than the threshold value, e.g. more than ten times, the brake control system 80 will communicate an alert to the user, as indicated by reference 96 in FIG. 4.

As a consequence, the first warning temperature level of the dynamic warning temperature profile is adjusted to a reduced warning temperature level. The reduced warning temperature level is set to lower temperature level than the first warning temperature level.

Further, in this example, the brake control system 80 will monitor if the temperature T exceeds the uppermost critical warning temperature $T_{stop}$ at one single occasion, as indicated by reference 97 in FIG. 4. As long as the uppermost critical warning temperature $T_{stop}$ is not exceeded, no alert is communicated to the user.

However, if the temperature T exceeds the uppermost critical warning temperature $T_{stop}$ at one single occasion, the brake control system 80 will immediately communicate an alert to the user, as indicated by reference 99 in FIG. 4. The alert associated with exceeding the uppermost critical warning temperature $T_{stop}$ is here different than the alert associated with exceeding the threshold value n. By way of example, the alert contains a request to the driver to stop the vehicle or perform a required emergency action. However, no emergency alert or emergency action will be executed as long as the temperature T is below the uppermost critical warning temperature $T_{stop}$, as indicated by reference 98 in FIG. 4. In this manner, there is provided a temperature warning strategy for the brake system and vehicle that contains different types of intervening actions or alerts to user or driver of the vehicle. It should be noted that the example embodiment as described in relation to FIG. 4 may be combined with any one of the steps from the above example embodiments, e.g. the example embodiments described in relation to FIGS. 2 and 3.

The disclosure also relates to the brake control system 80. The brake control system 80 comprises the brake system and the control unit for monitoring the temperature of the brake system. The brake control system is optionally configured to determine an initial warning temperature level of the brake system associated with communicating an alert to a user. In addition, the brake control system is configured to determine a dynamic warning temperature profile based on a warning temperature value of the brake system and a threshold value indicative of the number of times the temperature of the brake system exceeds the warning temperature value; monitor the number of times when the temperature of the brake system exceeds the warning temperature value; and, when the number of times the temperature of the brake system exceeds the threshold value, adjust the warning temperature level of the brake system to a reduced warning temperature level. The brake control system 80 is configured to perform a method according to any one of the example embodiments as described in relation to the FIGS. 2 to 4. In addition, the disclosure relates to the vehicle comprising the brake system and the brake control system according to any one of the example embodiments as described in relation to the FIGS. 1 to 4. In addition, the disclosure relates to a computer program comprising program code means for performing the steps of the method as described in relation to the FIGS. 1 to 4, when the program is run on a computer. In addition, the disclosure relates to a computer readable medium carrying a computer program comprising program means for performing the steps of the method as described in relation to the FIGS. 1 to 4 when the program means is run on a computer.

Thanks to the present disclosure, as exemplified by the example embodiments in FIGS. 1 to 4, it becomes possible to provide an improved temperature control strategy for the brake system in which temperature alerts to the user are provided based on a more dynamic set of parameters based on the dynamic warning temperature profile, as described herein.

While the method above has generally been described in relation to a brake system comprising a brake disc, the method and brake control system may likewise be configured to control and monitor other types of brake systems. Hence, it should be noted that the step of monitoring S30 the number of times when the temperature of the brake system exceeds the warning temperature value comprises monitoring the temperature of any one of a brake disc, a brake drum and a retarder of the brake system.

As mentioned above, it is to be noted that the steps of the method are typically performed by the brake control system 80, including the control unit 82, during use of the vehicle. Thus, the control unit is configured to perform any one of the steps of any one of the example embodiments as described above in relation to the FIGS. 1-4. A control unit may include a microprocessor, microcontroller, programmable digital signal processor or another programmable device. Thus, the control unit comprises electronic circuits and connections (not shown) as well as processing circuitry (not shown) such that the control unit can communicate with different parts of the truck such as the brakes, suspension, driveline, in particular an electrical engine, an electric machine, a clutch, and a gearbox in order to at least partly operate the truck. The control unit may comprise modules in either hardware or software, or partially in hardware or software and communicate using known transmission buses such as CAN-bus and/or wireless communication capabilities. The processing circuitry may be a general purpose processor or a specific processor. The control unit comprises a non-transitory memory for storing computer program code and data upon. Thus, the skilled addressee realizes that the control unit may be embodied by many different constructions.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the Figures may show a sequence the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

It is to be understood that the present disclosure is not limited to the embodiments described above and illustrated in the drawings; rather, the skilled person will recognize that many changes and modifications may be made within the scope of the appended claims. For example, although the present disclosure has mainly been described in relation to an electrical truck, the disclosure should be understood to be equally applicable for any type of electrical vehicle, in particular an electrical bus, an electrical car or the like. Variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for monitoring a temperature of a brake system of a vehicle, the method comprising:
    determining a dynamic warning temperature profile for the brake system, wherein the dynamic warning temperature profile is based on a warning temperature value of the brake system and a temperature event threshold value, wherein a temperature event occurs when the temperature of the brake system exceeds the warning temperature value of the dynamic warning temperature profile; and
    monitoring the number of temperature events; and
    when the number of temperature events has exceeded the temperature event threshold value, adjusting the warning temperature value of the dynamic warning temperature profile to a reduced warning temperature value.

2. The method of claim 1, further comprising monitoring the number of times when the temperature of the brake system exceeds the reduced warning temperature value of the brake system.

3. The method of claim 1, further comprising adjusting the dynamic warning temperature profile by reducing the temperature event threshold value to a reduced temperature event threshold value.

4. The method of claim 3, further comprising iterating the adjusting of the warning temperature value of the dynamic warning temperature profile to the reduced warning temperature value by further reducing the warning temperature value of the brake system to a reduced warning temperature value of the brake system until a number of iterations exceeds an iteration threshold value; and
    subsequently maintaining a latest reduced warning temperature value as a stationary warning temperature of the brake system.

5. The method of claim 4, further comprising iterating the adjusting of the warning temperature value of the dynamic warning temperature profile by further reducing the temperature event threshold value to a reduced temperature event threshold value until the number of iterations exceeds an iteration threshold value, and
    subsequently maintaining the latest reduced temperature event threshold value as a stationary temperature event threshold value.

6. The method of claim 1, further comprising communicating an alert to a user when the number of times the temperature of the brake system exceeds the temperature event threshold value.

7. The method of claim 1, wherein the dynamic warning temperature profile comprises a number of consecutive warning temperature values of the brake system and the temperature event threshold value defines a number of sub-threshold values, each one of the sub-threshold values being indicative of a number of times the temperature of the brake system exceeds a given warning temperature value among the number of consecutive warning temperature values; and
    monitoring the number of times when the temperature of the brake system exceeds any one of the number of consecutive warning temperature values.

8. The method of claim 1, wherein the monitoring of the number of temperature events comprises monitoring the temperature of one or more of a brake disc, a brake drum, and a retarder of the brake system.

9. The method of claim 8, wherein the temperature of the brake system is monitored by a sensor arranged at the brake system and/or the temperature of the brake system is monitored by a brake control unit of the brake system.

10. The method of claim 1, wherein the number of temperature events is monitored over a continuous braking operation of the vehicle.

11. The method of claim 1, in which any one or more of the determining, the monitoring, or the adjusting is performed by a brake control system during use of the vehicle.

12. A computer program product comprising a non-transitory computer readable medium having stored thereon a computer program comprising instructions for performing the method of claim 1 when the computer program is run on a computer.

13. A brake control system for a vehicle, the brake control system comprising:
 a brake system; and
 a control unit for monitoring a temperature of the brake system, the control unit being configured to determine a dynamic warning temperature profile for the brake system;
 wherein the dynamic warning temperature profile is based on a warning temperature value of the brake system and a temperature event threshold value, wherein a temperature event occurs when the temperature of the brake system exceeds the warning temperature value; and
 wherein the brake control system is configured to:
  monitor the number of temperature events; and
  adjust the warning temperature value of the dynamic warning temperature profile to a reduced warning temperature value when the number of temperature events has exceeded the temperature event threshold value.

14. A vehicle comprising the brake control system of claim 13.

* * * * *